United States Patent
Campetella et al.

(10) Patent No.: US 7,927,642 B2
(45) Date of Patent: Apr. 19, 2011

(54) METHOD FOR MAKING COFFEE WITH A CREMA LAYER

(76) Inventors: Carl James Campetella, Staten Island, NY (US); Gil Garcia, Staten Island, NY (US)

(*) Notice: Subject to any disclaimer, the term of this patent is extended or adjusted under 35 U.S.C. 154(b) by 1053 days.

(21) Appl. No.: 11/362,597

(22) Filed: Feb. 23, 2006

(65) Prior Publication Data
US 2007/0196551 A1   Aug. 23, 2007

(51) Int. Cl.
*A23L 1/01* (2006.01)
(52) U.S. Cl. ......... 426/433; 426/474; 426/477; 426/594
(58) Field of Classification Search .................. 426/474, 426/477, 594, 433
See application file for complete search history.

(56) References Cited

U.S. PATENT DOCUMENTS

| | | | |
|---|---|---|---|
| 3,793,933 A | 2/1974 | Weber | |
| 4,353,293 A * | 10/1982 | Illy | 99/283 |
| 4,618,500 A * | 10/1986 | Forquer | 426/433 |
| 4,858,522 A * | 8/1989 | Castelli | 99/280 |
| 5,103,716 A | 4/1992 | Mikkelsen | |
| 5,259,296 A | 11/1993 | Mikael | |
| 5,447,631 A * | 9/1995 | Mahlich | 210/455 |
| 5,463,934 A | 11/1995 | Locati | |
| 5,490,447 A | 2/1996 | Giuliano | |
| 5,605,091 A | 2/1997 | Garber | |
| 5,636,563 A * | 6/1997 | Oppermann et al. | 99/285 |
| 5,638,740 A * | 6/1997 | Cai | 99/295 |
| 5,650,186 A | 7/1997 | Annoni | |
| 5,896,806 A * | 4/1999 | Dal Tio | 99/289 T |
| 6,572,036 B2 * | 6/2003 | Glucksman et al. | 241/27 |
| 7,322,275 B2 | 1/2008 | Lussi | |
| 7,322,276 B2 | 1/2008 | Nicolini | |
| 7,328,649 B2 | 2/2008 | Morin | |
| 2005/0199128 A1 * | 9/2005 | Nicolini | 99/275 |
| 2006/0037481 A1 * | 2/2006 | Bicht | 99/279 |
| 2009/0145988 A1 * | 6/2009 | Kirschner et al. | 241/159 |

OTHER PUBLICATIONS

Andueza et al. J. Agric. Food Chem. 2002, vol. 50, pp. 7426-7431.*
Judith L. Toffenetti, letter to Ognjan V. Shentov Re: Prior Art to Invention Disclosed and Claimed in U.S. Appl. No. 11/499,837 and 11/0196551 (*sic*), dated Oct. 21, 2008.
Specialty Coffee Retailer, Jul. 2001, p. 34.
Specialty Coffee Retailer, Jan. 2002, p. 34.
Specialty Coffee Retailer, Jan. 2003, p. 68.
Specialty Coffee Retailer, Mar. 2004, p. 40.
Specialty Coffee Retailer, Feb. 2005, p. 12.
Specialty Coffee Retailer, Mar. 2006, p. 24.
Specialty Coffee Retailer, Sep. 2008, p. 38.
"Astra Automatic Espresso & Cappuccino Machines," catalog (copyright 2008).
Marybeth Peters, Register of Copyrights, United States of America, Certificate of Registration, Registration No. TX 6-863-365, effective date of registration: Sep. 12, 2008; Year of Completion: 1999; Date of 1st Publication: Jan. 1, 1999.
Astra, "Super Mega 1," brochure (undated).

(Continued)

*Primary Examiner* — Anthony Weier
(74) *Attorney, Agent, or Firm* — Megan E Lyman

(57) ABSTRACT

A method for brewing coffee, including the steps of transferring ground coffee to a brewing chamber, compressing the ground coffee, and forcing pressurized hot water through the ground coffee, thereby causing brewed coffee to emerge through a micro-filter, wherein the ratio of weight of ground coffee contained in the brewing chamber to volume of pressurized hot water forced through the ground coffee is 6 grams per fluid ounce or less.

17 Claims, 2 Drawing Sheets

OTHER PUBLICATIONS

Astra, "Operation Manual for Astra Super Automatic Machines," undated.

Astra, "Super Mega I Parts Manual," 1997.

Intertek Testing Services, "Factory Audit Manual and Procedural Guide for Complying With ETL Listing, In-Plant Labeling, and Follow-Up Service Requirements," Feb. 2, 1998.

Astra, Purchase Order for Super Mega 1, Feb. 8, 1995.

Astra, Purchase Order for Astra 2000, 22 gram brew chamber, extended program for grinding & extraction, Jan. 4, 2005.

Astra Manufacturing, Complaint for Damages and Injunctive Relief, Sep. 18, 2008.

Astra Manufacturing, "Discover . . . Super Mega One," owner's manual comprising pp. 1-23 (undated).

"Programming the Super Mega and Astra 2000," programming guide attached to owner's manual, pp. 1-5.

\* cited by examiner

METHOD FOR MAKING COFFEE WITH A CREMA LAYER

FIELD OF THE INVENTION

This invention relates generally to methods for making beverages. More particularly, the invention is directed to a method for brewing coffee.

BACKGROUND OF THE INVENTION

Coffee has been consumed as a beverage for centuries. Over time, a wide variety of coffee-making methods and devices have been developed, e.g. percolators, vacuum pots, the "French press," drip coffee makers, and others. During the first half of the 20th century, the espresso machine was developed in Italy. The principle of the espresso machine was to bring hot (but not boiling) water, under pressure, in contact with a quantity of finely ground, compressed coffee beans for a relatively short period of time, thereby producing one or two very small cups of highly flavored coffee.

The flavorful nature of espresso is mainly due to the layer of golden-colored crema floating at the top of the cup. The crema comprises emulsified oils and other substances extracted from the ground coffee beans by the pressurized water. Besides playing a key role in transmitting flavor, the crema layer has a visual appeal similar to that of a head on a glass of beer.

Other aspects of the espresso-making process that enhance the flavor are: 1) The hot water is in contact with the ground coffee for a relatively short time, long enough to extract flavor components but not so long as to damage them; and 2) Espresso is made as a single serving (or sometimes two servings), intended for immediate consumption, which prevents flavor components from degrading or evaporating.

These aspects of espresso-making are to be contrasted with other methods that involve the brewing of multi-cup quantities of coffee, which is then kept hot until consumed. Such methods typically require a longer period of contact between the ground coffee and the hot water, which can damage flavor components, and then some period of time between brewing and consumption, which can allow flavor components to degrade or escape through evaporation.

While existing methods of brewing coffee using espresso machines produce very flavorful coffee with an attractive crema layer, the coffee produced by such machines and processes is very thick and concentrated. Espresso as it emerges from the machine has been described as having the consistency of warm honey. The flavor is also very robust or strong. The quantity of coffee per cup is very small, on the order of one ounce. Because the quantity is small and the flavor volatile, it is usually consumed quickly, often while standing at a bar. This style of coffee is very much in favor in continental Europe, e.g. in France, Italy, and Spain, but is very different from the style of coffee chiefly favored in the United States.

While espresso consumption has increased markedly in the United States in recent decades, most coffee consumed in the United States is of a very different style, being less concentrated, less thick (less viscous), and less strongly flavored. Individual servings are also much larger, ranging from perhaps 6 to 20 ounces. Because this coffee is less concentrated and served in much larger quantity, different social rituals are associated with its consumption, compared to the quick consumption of espresso at a European espresso bar. In America, the large cups of low-concentration coffee are sipped over a relatively long period of time, for example as an accompaniment to a meal, or at a desk while working, or in a car while commuting.

In Europe, this style of coffee is called American Coffee and it is sometimes simulated by mixing together espresso and hot water. This, however, defeats the flavor preserving advantages of the normal espresso method and destroys the crema layer. At the same time, American tastes have become much more sophisticated, and many Americans, while continuing to prefer a large cup of coffee that can be sipped over time, would enjoy the visual appeal and flavor enhancement of a crema layer on the coffee. What is needed is a method for producing large servings of relatively low concentration coffee (i.e. American coffee) with some of the desirable characteristics of espresso, such as enhanced flavor and crema.

SUMMARY OF THE INVENTION

Methods and apparatus for making coffee, and coffee produced thereby, are disclosed. In one aspect, a method for brewing coffee comprises the steps of transferring ground coffee to a brewing chamber, compressing the ground coffee, and forcing pressurized hot water through the ground coffee, thereby causing brewed coffee to emerge through a microfilter, wherein the ratio of weight of ground coffee contained in the brewing chamber to volume of pressurized hot water forced through the ground coffee is 6 grams per fluid ounce or less. A coffee beverage produced by this method is also disclosed, preferably with a single serving of about 12 to 20 fluid ounces. Preferably, the coffee has a layer of crema, which may be about ¼" deep and may last for at least 10 minutes. In one aspect of the disclosure, the ground coffee is ground more coarsely than espresso coffee.

The coffee may be ground with burrs set between ¼" and ⅜" apart. The coffee may be ground using a slicing method. The amount of ground coffee transferred to the brewing chamber may be between about 13 grams and about 22 grams. The amount of pressurized hot water forced through the ground coffee may be between about 10 fluid ounces and 20 fluid ounces. In one specific embodiment, the brewing chamber can hold at least 22 grams of ground coffee at one time. The coffee may be compressed with more than 30 pounds of force distributed across the upper surface of the ground coffee. The coffee may be compressed with about 40 pounds of force distributed across the upper surface of the coffee.

In a specific embodiment, the coffee is compressed by a piston mechanism. In one aspect, the temperature of the water is more than 198 degrees Fahrenheit. The temperature of the water may be about 204 degrees Fahrenheit. The pressure of the water may be between 127 and 141 pounds per square inch. In one aspect, the step of forcing water through the coffee has a duration of more than 20 seconds. In a specific embodiment, the microfilter is made of a material having a low heat conductivity. The material of which the microfilter is made may be Teflon. The material of which the microfilter is made may be PVC plastic.

DETAILED DESCRIPTION OF THE INVENTION

The invention described in detail herein generally relates to an apparatus and method for making coffee.

Figure 1:
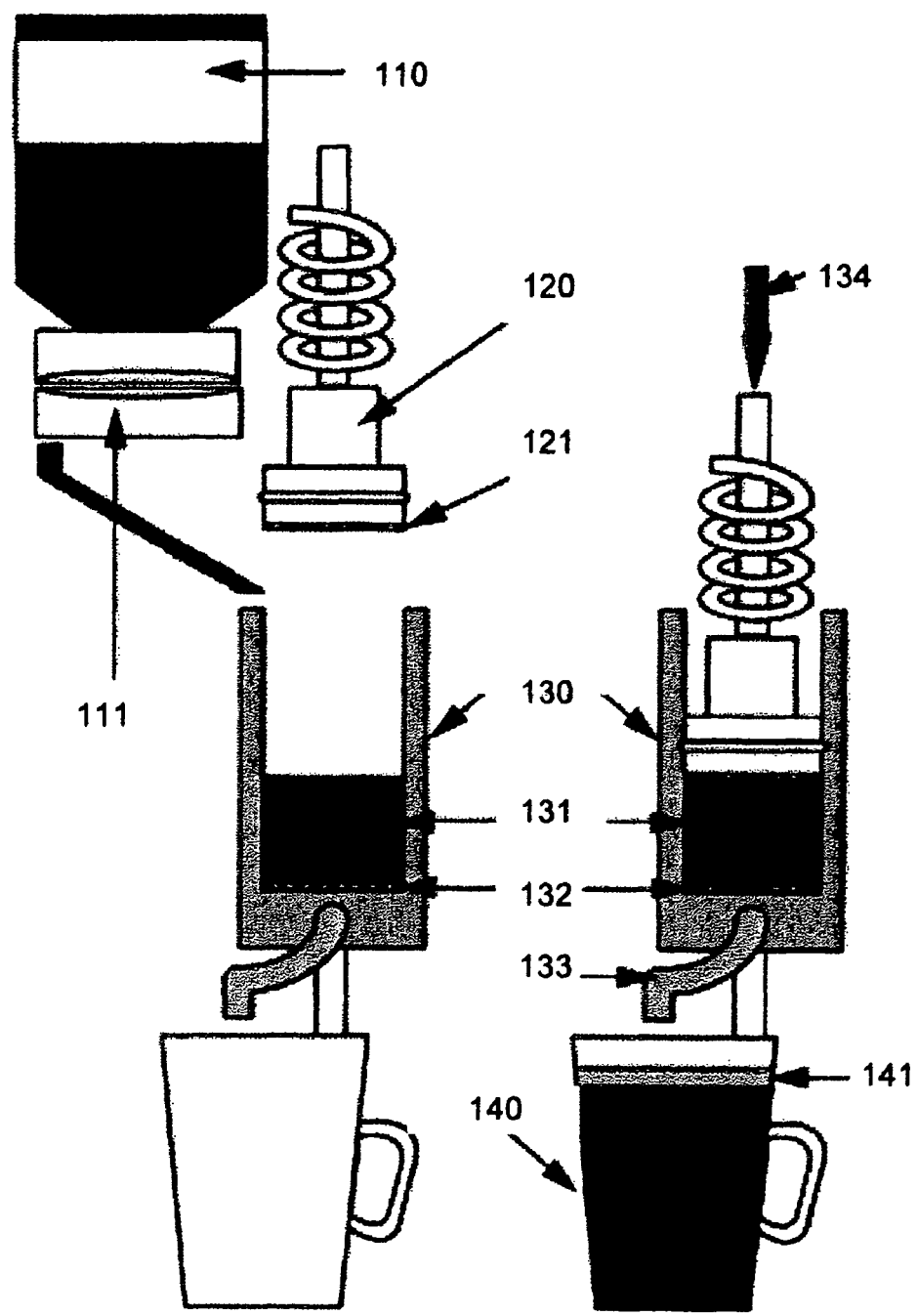
FIG. 1 depicts exemplary apparatus for making coffee.

FIG. 1 depicts an example apparatus that can be used in making coffee. The apparatus is intended as an example only, and other devices capable of performing the method steps discussed below can be used instead. Hopper 110 holds whole coffee beans. Grinding element 111 receives whole beans from hopper 110 and grinds or mills them to produce ground coffee 131 (also sometimes referred to as coffee grinds or coffee grounds). In one embodiment, grinding element 111 is of the European burr type, with adjustable burrs, although other types of coffee grinders or mills can be used. In a preferred embodiment, the burrs of grinding element 111 are arranged to grind the coffee with a slicing action. Adjustable burrs should preferably be set between ¼" and ⅜" apart. Ground coffee 131 produced by the slicing action of grinding element 111 differs from ground espresso coffee in consistency and fineness. In particular, it is substantially less fine than ground espresso coffee.

Ground coffee 131 is then transferred to brewing chamber 130. Brewing chamber 130 must be large enough to accommodate quantities of ground coffee 131 and hot water sufficient to produce a large cup of coffee. Preferably, brewing chamber 130 is sized to accommodate 13 to 22 grams of ground coffee 131.

Piston 120 compresses ground coffee 131, preferably with more than 30 pounds of force distributed across the upper surface of the coffee, and most preferably with about 40 pounds of force. Piston 120 can be driven by a spring, as shown, or by some other mechanism capable of imparting the required force. In another variation, ground coffee 131 can be compressed manually. Compressing ground coffee 131 is necessary in order to sustain uniform high-pressure contact between the grounds of ground coffee 131 and hot water. The about 40 pounds of force is higher than the force used in compressing espresso coffee, which is normally about 30 pounds. The higher force is necessitated by the consistency and fineness of ground coffee 131 which, as noted above, differs from the consistency and fineness of ground espresso coffee. If the force is applied manually, preferably the force is between about 35 and 45 pounds.

Pressurized hot water 134 is forced through piston 120, then through first microfilter 121, and then through ground coffee 131. In one embodiment, the bottom of piston 120 comprises infusion holes that admit water through microfilter 121 into the brewing chamber. Microfilter 121 acts as a shower screen to spread water evenly over the grounds and also prevents grounds from escaping out the top of the brewing chamber. In one embodiment, the infusion holes are enlarged to allow more water through the grinds in order to make a larger cup of coffee. Preferably, the size of the infusion holes is about 2 mm. In a preferred embodiment, there are 5 infusion holes. First microfilter 121 can be made of a metal (e.g. stainless steel), or of a low heat-conductivity material, such as Teflon or PVC plastic. The temperature of the water should be below the boiling point (i.e., below 212 degrees Fahrenheit). On the other hand, the temperature of the water should be high enough so that the product produced by the apparatus is a hot cup of coffee that will remain pleasantly hot when consumed over a relatively long period of time, as opposed to the quick consumption of a cup of espresso. Therefore, while the temperature of the water used in espresso-making is typically in the range of from 190 to 203 degrees Fahrenheit (see, e.g., coffeeresearch.orglespresso/definitions.htm, visited February, 2006), the temperature of pressurized hot water 134 is at the high end of this range or higher. Preferably, the temperature of pressurized hot water 134 is about 204 degrees Fahrenheit. However, other temperatures may be used. The water may be heated by an immersion heater, heat exchanger, or other suitable heat source. Preferably, the pressure of pressurized hot water 134 is between about 127 to 141 pounds per square inch. However, other pressures may be used. The water pressure may be created and sustained by an electric pump or other suitable mechanism.

Brewed coffee then emerges from second microfilter 132 and passes through coffee spout 133 and into cup 140. Second microfilter 132 can be made of metal (e.g. stainless steel), or of a low heat-conductivity material, such as Teflon or PVC plastic. In one embodiment cup 140 has a capacity or serving size of 12 to 20 ounces. However, other capacities or serving sizes, such as 5 ounces, 6 ounces, or 24 ounces, or other sizes, may be provided. The coffee in cup 140 produced in the above way typically has a crema layer 141. Preferably, crema layer 141 is about ¼" deep, but a different depth can be achieved with different coffee blends. Preferably, the crema layer lasts for at least 10 minutes, which time may vary in different cases. The depth and duration of the crema is determined by multiple factors, including the water pressure, water temperature and type of filter employed, as described herein.

Figure 2:
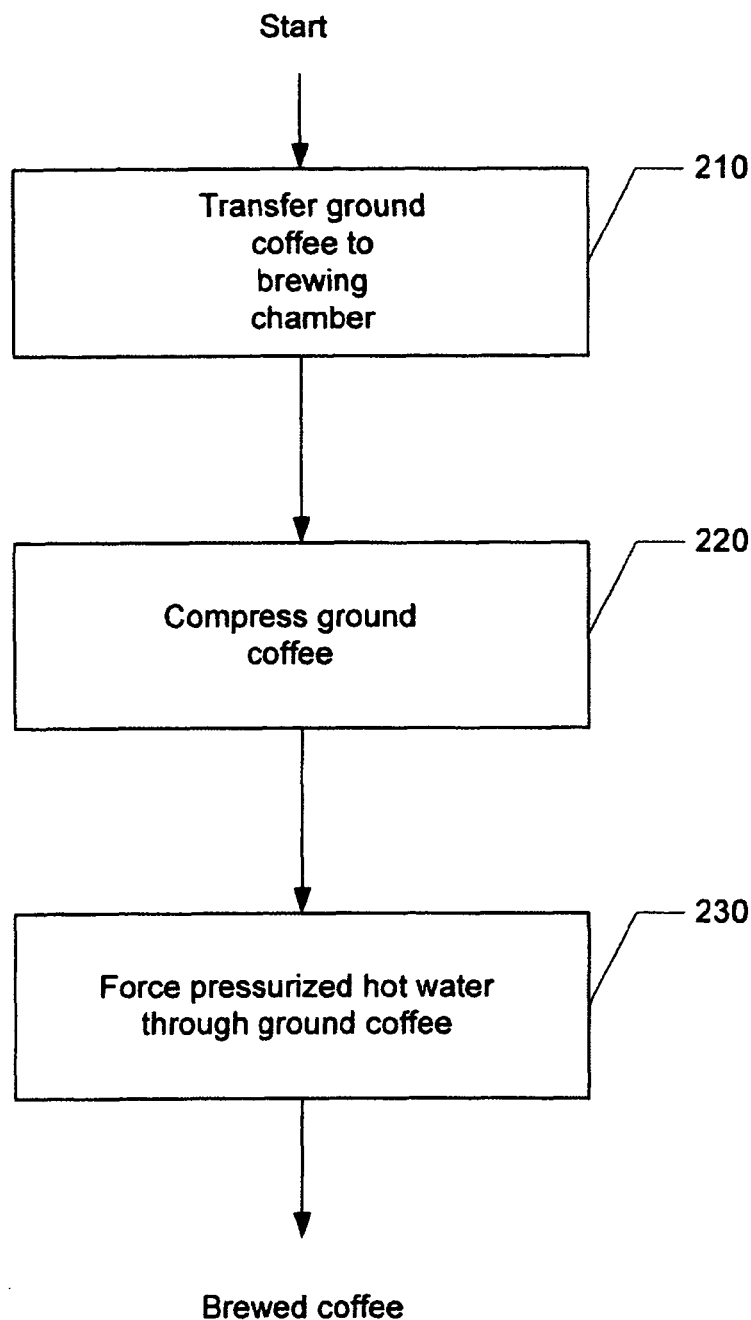
FIG. 2 is a flow chart of an exemplary process for making coffee.

FIG. 2 is a flowchart describing the steps of an exemplary method for making coffee.

Not illustrated, the first step is to grind the coffee, as described above.

At step 210, ground coffee is transferred to a brewing chamber.

At step 220, the ground coffee is compressed.

At step 230, pressurized hot water is forced through the ground coffee, wherein the ratio of weight of ground coffee to volume of pressurized hot water is 6 grams per fluid ounce or less, resulting in the production of brewed coffee.

Further details on the steps of the exemplary method are provided as follows.

The amount of ground coffee transferred to the brewing chamber at step 210 must be sufficient to prepare a relatively large cup of brewed coffee, preferably between about 13 grams and about 22 grams of ground coffee. However, smaller or larger amounts of ground coffee may be used.

The ground coffee transferred to the brewing chamber at step 210 preferably is ground more coarsely than espresso coffee. Preferably, the coffee is ground in a grinder or mill of the European burr type, with adjustable burrs, although other types of coffee grinders or mills may be used. The burrs preferably are arranged to grind the coffee using a slicing action. Adjustable burrs should preferably be set between ¼" and ⅜" apart, although other spacings may be used.

The force applied to compress the coffee at step 220, in one embodiment, is about 40 pounds, distributed across the surface of the ground coffee being compressed. However, other amounts of force, either less than 40 pounds or more than 40 pounds, may be used. In one variation, more than 30 pounds of force is used, 30 pounds being the typical compression force used in preparing espresso coffee. The coffee may be compressed using a piston mechanism driven, for example, by a spring or a motor, or some other mechanism capable of supplying the required force. The coffee may also be compressed by hand using, e.g., a hand-held tamper. If compressed by hand, preferably about 35 to 45 pounds of force is applied.

The hot pressurized water forced through the grounds at step 230 should have a temperature below the boiling point (i.e., below 212 degrees Fahrenheit). On the other hand, the temperature of the water should be high enough so that the product produced by the apparatus is a hot cup of coffee that will remain pleasantly hot when consumed over a relatively long period of time, as opposed to the quick consumption of a cup of espresso. Therefore, while the temperature of the water used in espresso-making is typically in the range of from 190 to 203 degrees Fahrenheit (see, e.g., coffeeresearch.org), the temperature of pressurized hot water forced through the grounds at step 230 is at the high end of this range or higher. Preferably, the temperature of pressurized hot water is 204 degrees Fahrenheit. However, other temperatures may be used. The water may be heated by an immersion heater, heat exchanger, or other suitable heat source. Preferably, the pressure of pressurized hot water is between about 127 to 141 pounds per square inch. However, other pressures may be used. The water pressure may be created and sustained by an electric pump or other suitable mechanism. Preferably, the duration of the step of forcing hot pressurized water through the grounds is more than 20 seconds, in order to produce a relatively large (12-20 fluid ounce) serving of the desired concentration. However, other durations may be used, depending in particular on the desired serving size.

As noted above, amounts of ground coffee in the range of about 13 to 22 grams are transferred to the brewing chamber. However, smaller amounts (e.g. 10 grams) or larger amounts (e.g. 26 grams) of coffee may be used. Amounts of pressurized hot water applied at step 230 should be sufficient to produce the required relatively large servings, e.g. 12 to 20 fluid ounces in one embodiment. (The volume of pressurized hot water applied in the brewing process is at least equal to the volume of the intended serving of brewed coffee, and but typically somewhat greater, since some pressurized hot water will be absorbed by the grounds and remain behind in the brewing chamber.) The amount of pressurized hot water is, thus, significantly more than the amount required to produce a 1-2 ounce serving of espresso.

Also, the ratio of the weight of ground coffee in the brewing chamber to the volume of pressurized hot water forced through it at step 230 differs significantly from the corresponding parameter in the brewing of traditional espresso. In the brewing of espresso, this ratio may typically be in the range of 6.5 to 7 grams of ground coffee per fluid ounce of hot pressurized water. That is, in the brewing of a one-ounce shot of espresso, 6.5 or more grams of ground coffee may be used. In the exemplary method of FIG. 2, by contrast, the ratio may be, for example, 13 grams of ground coffee to about 12 fluid ounces of hot pressurized water, or 22 grams of ground coffee to about 20 fluid ounces of hot pressurized water, or a ratio of about 1.1 to one. Other variations with ratios either higher or lower than 1.1 are possible, while still remaining less than the 6.5 to 7 grams of ground coffee per fluid ounce of hot pressurized water typical of espresso-brewing. For example, in one variation, the ratio is 6 grams per fluid ounce or less. In a preferred embodiment, 13.5 grams of coffee and 10 fluid ounces of water are used, or a ratio of 1.35.

The coffee produced by the described method may comprise a single serving of about 12 to 20 fluid ounces. It will be appreciated, of course, that other serving sizes, such as 5 ounces, 6 ounces, or 24 ounces, or other sizes, either greater than 20 or less than 12 ounces, may be produced. The coffee produced by the method may have a crema layer. Preferably, the crema layer is about ¼" deep. However, it may have a different depth. Preferably, the crema layer lasts for at least 10 minutes. However, the crema layer may last for a shorter or longer time.

The description contained herein is for purposes of illustration and not for purposes of limitation. Changes and modifications may be made to the embodiments of the description and still be within the scope of the invention. Furthermore, obvious changes, modifications or variations will occur to those skilled in the art. Also, all references cited above are incorporated herein by reference, in their entirety, for background and to assist the reader of this disclosure.

While the invention has been shown and described herein with reference to particular embodiments, it is to be understood that the various additions, substitutions, or modifications of form, structure, arrangement, proportions, materials, and components and otherwise, used in the practice and which are particularly adapted to specific environments and operative requirements, may be made to the described embodiments without departing from the spirit and scope of the present invention. Accordingly, it should be understood that the embodiments disclosed herein are merely illustrative of the principles of the invention. Various other modifications may be made by those skilled in the art which will embody the principles of the invention and fall within the spirit and the scope thereof.

We claim:

1. A method for brewing a serving of coffee, comprising the steps of:
    transferring between about 13 grams and about 22 grams of ground coffee to a brewing chamber;
    compressing the ground coffee at a force between approximately 35 and 45 pounds; and
    forcing pressurized hot water through the ground coffee, wherein the pressure of the hot water is between 127 and 141 pounds per square inch, thereby causing brewed coffee to emerge through a micro-filter;
    wherein the ratio of weight of ground coffee contained in the brewing chamber to volume of pressurized hot water forced through the ground coffee is 6 grams per fluid ounce or less of a coffee product has a layer of crema that is about ¼ inch deep and lasts for at least 10 minutes.

2. The coffee of claim 1 comprising a single serving of about 12 to 20 fluid ounces.

3. The method of claim 1 wherein the coffee is ground with burrs set between ¼" and ⅜" apart.

4. The method of claim 1 wherein the coffee is ground using a slicing method.

5. The method of claim 1 wherein the amount of pressurized hot water forced through the ground coffee is between about 10 fluid ounces and 20 fluid ounces.

6. The method of claim 1 wherein the coffee is compressed by a piston mechanism.

7. The method of claim 1 wherein the temperature of the water is more than 198 degrees Fahrenheit.

8. The method of claim 7 wherein the temperature of the water is about 204 degrees Fahrenheit.

9. The method of claim 1 wherein the step of forcing water through the coffee has a duration of more than 20 seconds.

10. The method of claim 1 wherein the microfilter is made of a material having a low heat conductivity.

11. The method of claim 10 wherein the material is Teflon.

12. The method of claim 10 wherein the material is PVC plastic.

13. A method for brewing a serving of crema coffee, comprising the steps of:
    transferring at least 14 grams of ground coffee to a brewing chamber capable of containing between approximately 13 and 22 grams;
    compressing the ground coffee by use of a piston mechanism at a force between approximately 35 and 45 pounds; and
    forcing approximately 10 to 20 ounces of pressurized hot water having a temperature of approximately 204 degrees through the ground coffee for a duration of more than 20 seconds, wherein the pressure of the hot water is between 127 and 141 pounds per square inch thereby causing brewed coffee to emerge through a micro-filter fabricated from a material having low heat conductivity; wherein the ratio of weight of ground coffee contained in the brewing chamber to volume of pressurized hot water forced through the ground coffee is 6 grams per fluid ounce or less of a coffee product has a layer of crema that is about ¼ inch deep and lasts for at least 10 minutes.

14. The method of claim 13, producing a coffee comprising a single serving of about 12 to 20 fluid ounces.

15. The method of claim 13 wherein the coffee is ground with burrs set between ¼" and ⅜" apart.

16. The method of claim 13 wherein the material having low heat conductivity is Teflon.

17. The method of claim 13 wherein the material having low heat conductivity is PVC plastic.

* * * * *